United States Patent [19]

Nakamura

[11] Patent Number: 4,895,118

[45] Date of Patent: Jan. 23, 1990

[54] VALVE CONTROL SYSTEM OF INTERNAL COMBUSTION ENGINES

[75] Inventor: Akihisa Nakamura, Tokyo, Japan

[73] Assignee: Fuji Jukogyo Kabushiki Kaisha, Tokyo, Japan

[21] Appl. No.: 252,604

[22] Filed: Oct. 3, 1988

[30] Foreign Application Priority Data

Oct. 6, 1987 [JP] Japan .................................. 62-252740

[51] Int. Cl.[4] .............................................. F02D 41/16
[52] U.S. Cl. ...................................... 123/339; 123/585
[58] Field of Search ............... 123/339, 352, 361, 399, 123/585, 586, 587, 588, 589

[56] References Cited

U.S. PATENT DOCUMENTS

| | | | |
|---|---|---|---|
| 4,488,527 | 12/1984 | Pfalzgraf et al. | 123/399 |
| 4,491,112 | 1/1985 | Kanegae et al. | 123/399 X |
| 4,519,360 | 5/1985 | Murakami | 123/399 |
| 4,519,361 | 5/1985 | Murakami | 123/399 |
| 4,612,615 | 9/1986 | Murakami | 123/399 X |
| 4,760,824 | 8/1988 | Sakurai | 123/399 |
| 4,760,825 | 8/1988 | Morita | 123/399 X |
| 4,763,623 | 8/1988 | Sasaki | 123/339 |
| 4,765,299 | 8/1988 | Wataya et al. | 123/339 X |
| 4,771,755 | 9/1988 | Asakura et al. | 123/589 |

Primary Examiner—Willis R. Wolfe
Attorney, Agent, or Firm—Beveridge, DeGrandi & Weilacher

[57] ABSTRACT

A valve control system of an internal combustion engine has a control circuit comprising valve control quantity setting means for setting the control quantity of valve means installed in the engine in accordance with the operational state of the engine and generating a first actuation signal in accordance with said control quantity and actuating means for actuating said valve means in accordance with said first actuation signal, in which said control circuit comprises: clock oscillation means for generating a check signal shorter than the reaction time of said valve means; synthesizing means for synthesizing said check signal and said first actuation signal and generating a synthesized signal; actuating means converting said synthesized signal into a second actuation signal and a valve actuation state determination signal as outputs, which are transmitted to said valve means; and valve actuation state decision means formed for detecting said valve actuation state determination signal and deciding the actuation state of said valve means.

2 Claims, 4 Drawing Sheets 4,895,118

VALVE CONTROL SYSTEM OF INTERNAL COMBUSTION ENGINES

BACKGROUND OF THE INVENTION

This invention relates generally to internal combustion engines, valve means thereof, means for actuating the valve means, and means for controlling the actuating means. More particularly, the invention relates to a valve control system of an internal combustion (I.C.) engine which system operates to monitor and control the actuation of the valve means of the engine.

Valve control systems of I.C. engines of the type which regulates the flow rate of air supplied into an I.C. engine by controlling the opening degree of the throttle valve or an idling speed control valve installed in parallel the induced pipe of I.C. engines therewith are known. In a valve control system of this type, signals indicative of the engine operational state such as, for example, the engine (rotational) speed, are transmitted to an electronic control unit, which thereupon transmits an actuation signal for controlling the opening degree of the valve. More specifically, from a comparison of the actual engine speed and an objective speed, a feedback correction quantity is computed, and an activation signal generated in accordance with the correction for increasing or decreasing this feedback correction quantity is outputted to bring the opening degree of valve into coincidence with the objective value with respect to the operational state at the time.

However, in the event that valve means such as the idling speed control valve (ISC valve) no longer operates normally (because of a malfunctioning of the valve itself or an electrical failure such as shorting or breakage in the valve actuating circuit), and, in this state, the operation of the engine is continued., not only will the engine speed become unstable and the drivability be impaired, but accurate and positive control of operational conditions such as the engine speed and the air-fuel ratio will become impossible.

Accordingly, as disclosed in Japanese Laid-Open Patent Publication No. 95152/1985, the ISC valve is provided with a position sensor, and the valve state is judged to be normal if an objective opening degree $P_0$ outputted from the electronic control unit and the actual opening degree $P_1$ obtained from the position sensor are such that the relationship $|P_1 - P_0| < \Delta P$, wherein $\Delta P$ is a certain deviation, is satisfied. If this relationship is not satisfied, the valve state is determined to be abnormal, and a measure such as notifying the operator, cutting off the fuel, or shifting to a specific operational state is carried out.

A problem which arises in a known valve control system as described above is the necessity of providing the valve with a position sensor. Another problem is that, when the temperature characteristics of the solenoid and valve error are considered, a considerably wide $\Delta P$ must be set, and for this reason, even if a failure or malfunctioning occurs, it cannot be detected if the quantity $|P_1 - P_0|$ is less than $\Delta P$. Still another problem is that, because of the Construction of the valve in some cases, the objective opening degree is not attained instantaneously, and a relatively long time is required from the instant the objective opening degree is outputted until it is detected. In this long interval, the engine operational conditions change, and objective values vary successively, in which case detection of trouble becomes impossible.

Furthermore, in general, there are more cases wherein the valve fails to operate because of a break or short in the harness in the actuating circuit for transmitting electrical signals to the valve than cases of mechanical trouble of the valve itself. However, the published disclosures in the prior art indicate that the former cases have so far not received serious consideration.

SUMMARY OF THE INVENTION

Accordingly, I have sought to provide a valve control system of an I.C. engine including a control circuit having trouble diagnosing means in which the operational state of a valve failing to function normally because of an electrical cause can be detected electrically.

According to this invention there is provided a control system of an internal combustion engine, and which system has a control circuit comprising valve control quantity setting means for setting the control quantity of valve means installed in the engine in accordance with the operational state of the engine and generating a first actuation signal in accordance with the control quantity and actuating means for actuating said valve means in accordance with the first actuation signal, in which the control circuit comprises: clock oscillation means for generating a check signal shorter than the reaction time of the valve means; synthesizing means for synthesizing the check signal and the first actuation signal and generating a synthesized signal; the actuating means converting the synthesized signal into a second actuation signal and a valve actuation state determination signal as outputs, which are transmitted to said valve means; and valve actuation state decision means for detecting the valve actuation state determination signal and decision the actuation state of the valve means.

By the use of a valve control system as summarized above, since any abnormality of the valve means is detected directly from the valve actuation signal, the valve abnormality can be detected promptly. Furthermore, separately from the valve actuation signal in the control circuit, a check signal is applied, and this check signal is converted by way of the actuating means into a valve actuation state determination signal. Therefore, by merely monitoring the variation of this valve actuation state determination signal in the timing to which the check signal has been applied, the abnormality can be readily and accurately diagnosed.

The nature, utility, and further features of this invention will be more clearly apparent from the following detailed description with respect to a preferred embodiment of the invention when read in conjunction with the accompanying drawings, briefly described below.

DETAILED DESCRIPTION OF THE INVENTION

Figure 1:
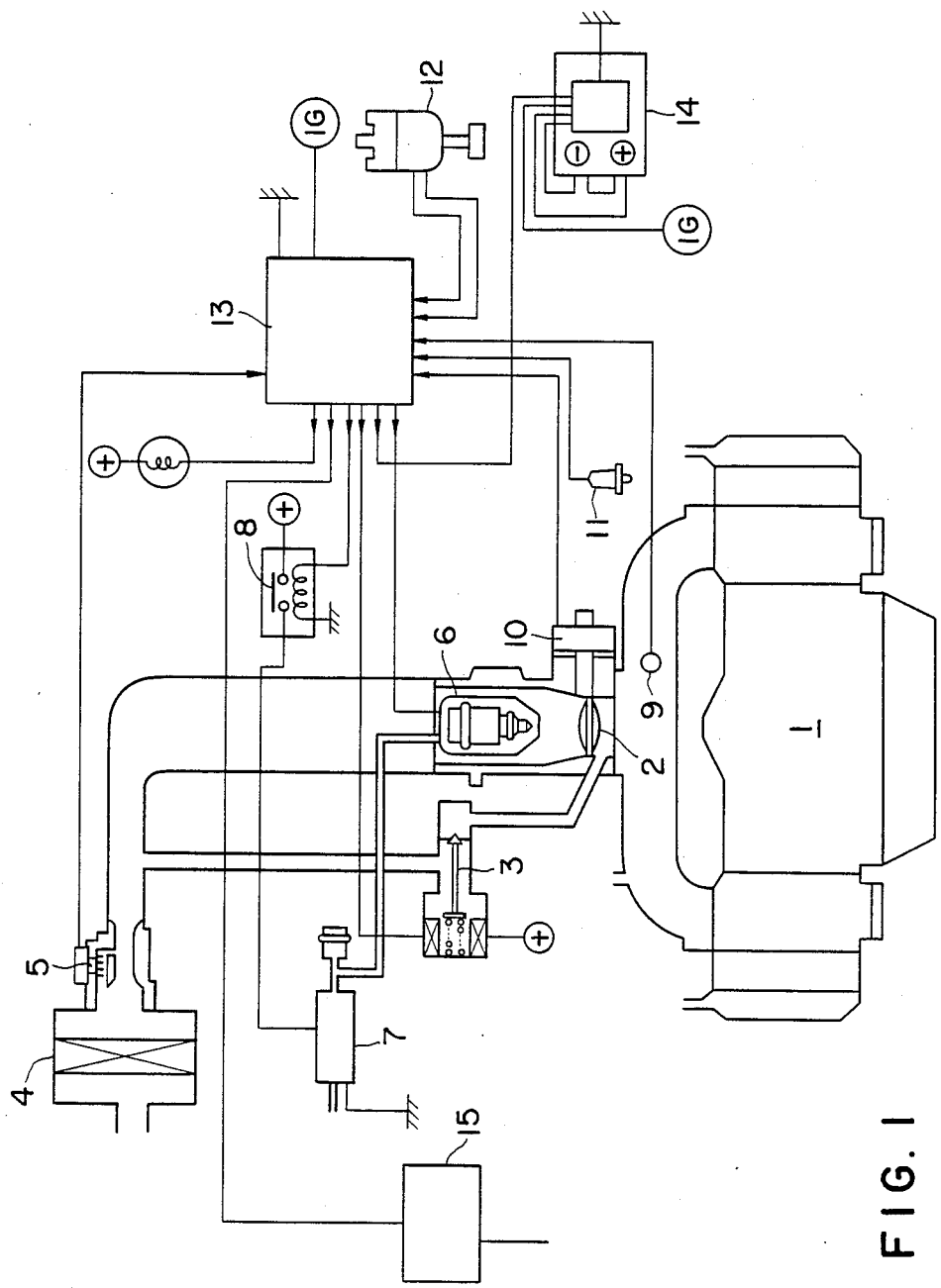
FIG. 1 is a schematic diagram of one example of a valve control system according to this invention.

Referring first to FIG. 1, an I.C. engine 1 is provided with its air-fuel mixture via an intake system provided with a throttle valve 2 and valve means installed parallelly thereto in the form of an idling speed control valve 3 (hereinafter referred to as an ISC valve). Air is aspirated into the intake system at its upstream end through an air cleaner 4, and the flow rate of this air is measured by an air flow meter 5 installed downstream from the air cleaner 4. A fuel injection valve 6 is provided in the intake system upstream from the throttle valve 2 and is supplied with fuel by a fuel pump 7, which operates in response to an electrical signal transmitted thereto by way of a relay switch 8 by an electronic control unit 13 described hereinafter.

The electronic control unit 13 is supplied with detection signals from at least five sensors, namely: a cooling water temperature sensor 9 provided in the engine 1; a throttle sensor 10 operatively coupled to the throttle valve 2; an oxygen ($O_2$) sensor 11 provided in the exhaust system of the engine 1; a rotational speed or tachometric sensor 12 provided in the distributor of the ignition system of the engine 1; and the above mentioned air flow meter 5 serving as an air flow rate sensor. Thus, the control unit 13 receives, from these detection signals, information indicating the state of operation of the engine 1 and, in accordance with this information, transmits respective control signals to the ignition coil 14, the coil of the above mentioned relay switch 8, the fuel injection valve 6, the ISC valve 3, and a control component 15 for a kickdown solenoid (not shown).

Figure 2:
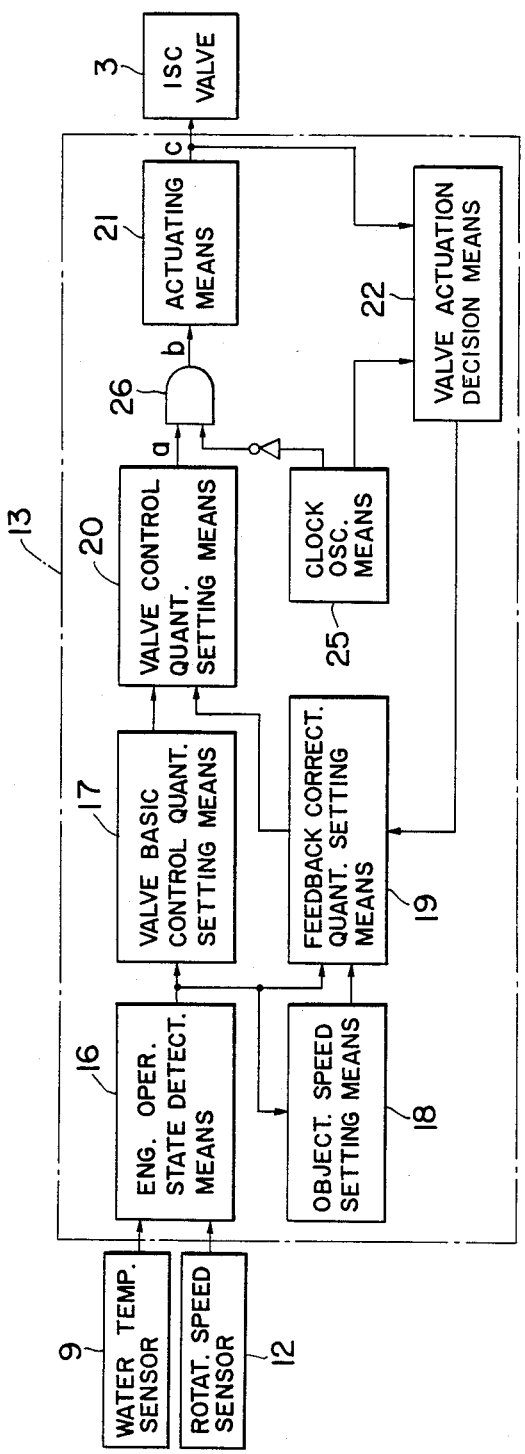
FIG. 2 is a block diagram indicating the control circuitry of the valve control system.

Particularly in the control of the ISC valve 3 according to this invention, the detection signals from the cooling water temperature sensor 9 and the rotational speed sensor 12 are fed as indicated in FIG. 2 to an engine operational state detecting means 16, which detects the present state of the operation of the engine and transmits a corresponding detection signal to valve basic control quantity setting means 17. In accordance with the cooling water temperature, this means 17 chooses the basic control quantity of the ISC valve 3 from the data previously stored in a device such as a ROM.

Furthermore, the detection signal from the engine operational state detecting means 16 is fed also into an objective speed sitting means 18, which thereupon sets the objective speed of the engine in accordance with the cooling water temperature and transmits its output signal to feedback correction quantity setting means 19. Separately, the actual engine speed is inputted into this feedback correction quantity setting means 19 by way of the engine operational state detecting means 16 and compared with the objective speed. As a result, the feedback correction quantity setting means 19 outputs a feedback correction quantity, which, together with the output signal from the valve basic control quantity setting means 17, is applied to valve control quantity setting means 20.

This setting means 20 thereupon sets the ISC valve control quantity in accordance with the valve basic control quantity and the feedback correction quantity and outputs a first actuation signal comprising, for example, a duty signal corresponding to this ISC valve control quantity. This first actuation signal is inverted by actuating means 21 and thereby converted into a second actuation signal, which controls the control quantity of the ISC valve 3. For a control signal, a check signal is formed from a clock oscillation means 25 as a pulse signal of a duration shorter than the reaction duration of the ISC valve 3.

The check signal is introduced at specific time intervals through an AND circuit 26 functioning as signal synthesizing means. The check signal is also supplied directly to valve actuation state decision means 22. Furthermore, the check signal applied to the above mentioned first actuating signal is inverted by the actuating means 21 and converted into a valve actuation state determination signal. Separately, the output signal of the actuating means 21 is supplied to the valve actuation state decision means 22, where the above mentioned valve actuation state determination signal is detected and compared with the check signal.

If an electrical malfunctioning, such as a line breakage in a harness, occurs in the actuating means 21, the valve actuation state decision signal is not detected by the valve actuation state decision means 22, which thereupon determines that an abnormality has occurred in the output signal of the actuating means 21 and outputs a malfunctioning determination signal. In response to this signal, the correction quantity of the feedback correction quantity setting means 19 is cleared, and the feedback control is stopped.

Figure 3:
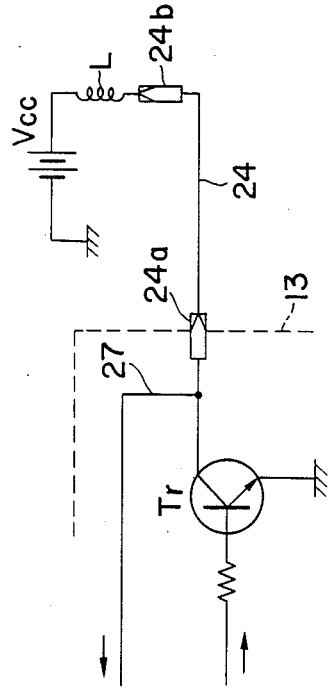
FIG. 3 is a fragmentary circuit diagram showing the essential organization of an activation circuit.

A specific organization of the electrical circuit of the output part of the valve control quantity setting means 20 and the input parts of the actuating means 21, the solenoid of the ISC valve, and the valve actuation state decision circuit 22 is shown by one example in FIG. 3. Here, the output signal of the valve control quantity setting means 20 is applied to the base of a power transistor Tr, the emitter of which is grounded and the solenoid L of the ISC valve 3 is connected between a power source Vcc and the collector of the transistor Tr by way of and in series with a harness 24. Furthermore, a monitor line 27 connected at its one end to the signal input part of the valve actuation state decision means 22 is connected at its other end to the collector of the power transistor Tr.

If, in the electrical organization as described above, a break occurs in the harness 24 at a place such as the junction 24a or 24b for a reason such as defective connection, the inverted signal of the pulse signal hitherto applied to the base of the power transistor will no longer be transmitted through the monitor line 27. Under normal circumstances, the valve actuation state decision signal accompanying the above mentioned inverted signal and the output signal of the clock oscillation means 25 are compared in the valve actuation state decision means 22 with the result that it is determined that the state is normal, and a decision signal indicating that the valve is in normal state is applied to the feedback correction quantity setting means 19.

In the above described event of detection of an abnormality, that is, a break occurring in the harness 24, however, the fact that the valve actuation state determination signal is not being outputted can be detected. As a result, a decision signal indicating a valve trouble is applied to the feedback correction quantity setting means 19, and the feedback correction quantity is cleared, whereby feedback control is stopped.

Figure 4:
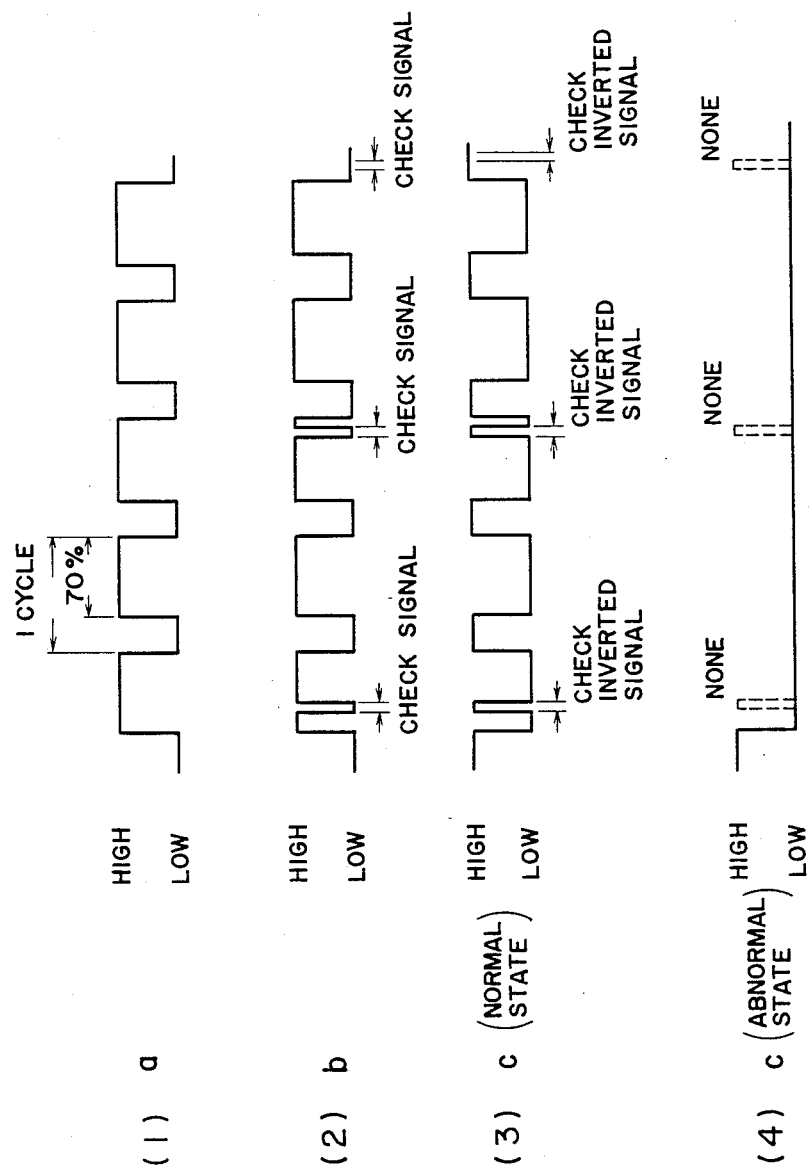
FIGS. 4(1)a through 4(4)c are time charts indicating functions in the operation of the valve control system.

In this case, although the duty of the actuation signal itself varies in accordance with the feedback, when a malfunction is determined, since the feedback correction quantity is cleared, the opening degree of the ISC valve 3 is determined by only the basic opening degree of the valve set at the valve basic control quantity setting means 17. Furthermore, the output waveforms of the first and second actuation signals, the output waveforms of the check signal and the valve actuation state determination signal with respect to the input side a and the output side b of the AND circuit 26 and the output side c of the actuating means 21 are shown in the time chart of FIG. 4.

In this time chart, the actuating signals are shown with 70-percent duty, as an example, and the width of the check signal is set at a length value, for example, which will not have an influence on the solenoid of the ISC valve 3, and which, moreover, is determined with consideration of delay time such as the response delay time of the transistor, that is, a width value of the order of approximately 200 μS. As is apparent from FIG. 4, in the event of a failure such as a break in the harness, the inverted signal of the check signal, that is, the valve actuation state determination signal does not appear on the output side of the actuating means 21. For this reason, this state is promptly detected by the valve actuation state decision means 22.

Figure 5:
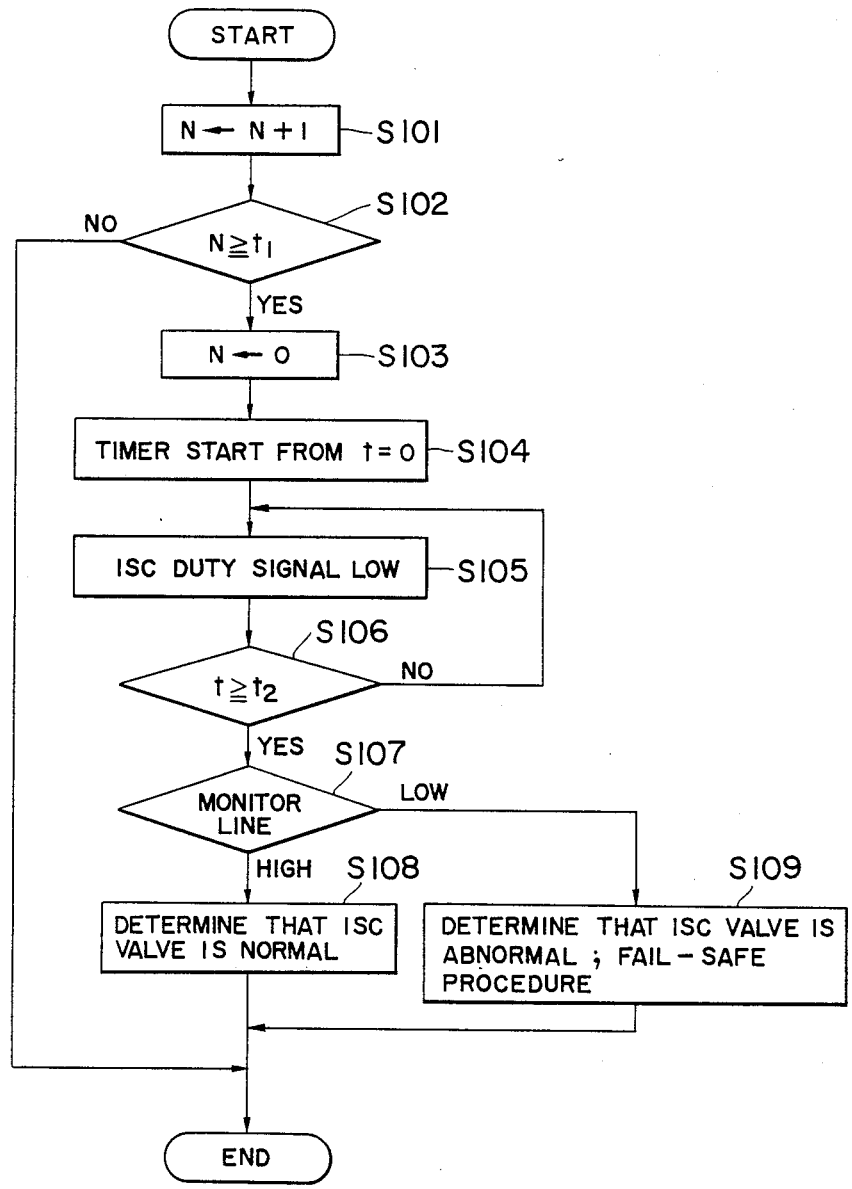
FIG. 5 is a flow chart indicating functional steps in the detection of abnormalities in the valve control.

The process of diagnosis of a failure or malfunction will now be described with reference to the flow chart of FIG. 5. The routine indicated in FIG. 5 is based on one passage in X seconds. Thus, if the check signal is to be generated every elapsing of $t_1$ cycle, a check signal is transmitted once in $X \times t_1$ second. Furthermore, $t_2$ represents the response delay time of the transistor, etc., and the reaction delay time of the waveform on the collector side of the aforedescribed transistor due to dulling of the waveform depending on the function of the solenoid.

In step S101, count N is counted up to N+1, and in the succeeding step S102, it is determined whether or not N satisfies the relation $N \geq t_1$. If N is less than $t_1$, the routine is terminated, but if N is equal to or greater than $t_1$, it is determined to be the output timing of the check signal of the clock oscillation means 25. Then, in the following step S103, N is cleared, and in step S104, a timer is started from t=0. Then, in step S105, by imparting the check signal to the first actuation signal outputted from the valve control quantity setting means 20, LOW setting is carried out, the process then moving on to step S106. In step S106, it is determined whether or not the time which was started in the previous step S104 has reached a predetermined time $t_2$, that is, whether or not $t \geq t_2$ is valid, and, if not (negative result), the process returns to step S105. In this manner, a leeway in time is gained with respect to the response delay of the transistor and the like.

On the other hand, if the above result is affirmative, it is determined in step S107 whether or not the output (the valve actuation state determination signal) of the monitor line 27 in the valve actuation state decision means 22 at that time is LOW. If it is HIGH, since this indicates that the state of the actuating circuit of the ISC valve is normal, it is determined in step S108 that it is normal. For this reason, a correction value is outputted from the feedback correction quantity setting means 19. On the other hand, if the above mentioned output of the monitor line 27 is LOW, an abnormality is determined in step S109. As a consequence, a signal which clears the correction quantity and stops the feedback control is applied from the valve actuation state decision means 22 to the feedback correction quantity setting means 19. As a result, the valve control quantity setting means 20 sets the control quantity of the ISC valve 3 in accordance with the basic control quantity set by the valve basic control quantity setting means 17.

While, in the above described example, the fail-safe feature relative to a failure such as a break in the harness in the actuating circuit of the ISC valve has been described, this invention is not restricted thereto, being applicable also to any valve means whose actuation is controlled in response to an operational signal from a control circuit.

According to this invention as described in detail above, in a control circuit for transmitting an actuation signal to a control valve such as an ISC valve, a check signal is imparted to a first actuation signal from valve control quantity setting means, and the resulting signal added the check signal to the first actuation signal is inverted in actuating means, and a second actuation signal and a valve actuation state determination signal are obtained. For this reason, by merely monitoring the variations of the actuation state decision signal in the timing to which the check signal has been imparted, an electrical failure such as a break or short in the harness can be readily and accurately diagnosed, and at the same time the load on the control software can be reduced. Furthermore, the valve control system according to this invention affords effective stabilization of the operational state of the engine by clearing the feedback correction quantity when trouble of the control valve is determined.

What is claimed is:

1. In a system for controlling a valve means in an internal combustion engine, which system comprises sensors for monitoring respective variables indicative of the operational state of the engine and generating respectively corresponding detection signals and a control unit operating in response to said detection signals to control the opening degree of said valve means in accordance with said operational state of the engine, the improvement comprising:

detecting means for detecting the operational state of the engine and transmitting a corresponding detection signal;

control quantity setting means for receiving said detection signal and choosing the basic control quantity of said valve means from the data stored in ROM;

objective speed setting means for setting the objective speed of the engine in accordance with the cooling water temperature from said detecting means and generating its output signal;

feedback correction quantity setting means for receiving the actual engine speed from said detecting means and said output signal from said objective speed setting means and setting a feedback correction quantity;

valve control quantity setting means for setting the control quantity of said valve means in response to said detection signals and generating a first actuation signal in accordance with said control quantity;

actuating means for actuating the valve means in response to said first actuation signal;

clock oscillation means for generating a check signal shorter than the reaction time of said valve means;

synthesizing means for synthesizing said check signal and said first actuation signal to generate a synthesized signal, which is converted by said actuating means into a second actuation signal and a valve actuation state determination signal as outputs, which are transmitted to said valve means; and
valve actuation state decision means for detecting said valve actuation state determination signal and deciding the actuation state of said valve means.

2. A system for controlling a valve means as claimed in claim 1 in which said sensors are at least an air flow meter for monitoring the air flow in the air intake duct of the engine, a throttle sensor for monitoring the operation of the throttle of the engine, a cooling water temperature sensor, an oxygen ($O_2$) sensor for monitoring the quantity of $O_2$ in the exhaust gas discharging system of the engine, and an engine rotational speed sensor.

* * * * *